United States Patent [19]

Biesecker

[11] 4,044,823
[45] Aug. 30, 1977

[54] METHOD AND APPARATUS FOR CONTROLLING AIR-CONDITIONING SYSTEMS

[75] Inventor: Frederick S. Biesecker, Columbus, Ohio

[73] Assignee: Ranco Incorporated, Columbus, Ohio

[21] Appl. No.: 661,620

[22] Filed: Feb. 26, 1976

[51] Int. Cl.$^2$ ............................................. F25B 29/00
[52] U.S. Cl. ........................................ 165/16; 165/22; 165/27; 236/44 C
[58] Field of Search ..................... 165/2, 22, 27, 16; 236/44, 49

[56] References Cited
U.S. PATENT DOCUMENTS

| | | | |
|---|---|---|---|
| 3,745,778 | 7/1973 | Attridge | 165/27 |
| 3,788,386 | 1/1974 | Demaray | 165/22 |
| 3,915,376 | 10/1975 | Attridge | 165/16 |

*Primary Examiner*—Carroll Dority, Jr.
*Assistant Examiner*—Daniel J. O'Connor
*Attorney, Agent, or Firm*—Watts, Hoffmann, Fisher & Heinke Co.

[57] ABSTRACT

An air conditioning system controlled for automatically heating and/or cooling a multiple zone building is disclosed wherein each zone includes a zone temperature responsive load transmitter. Each load transmitter produces an output command signal for controlling operation of damper units and heating and cooling equipment. The command signal configuration is modified to avoid operation of heating and cooling equipment throughout a relatively wide "no load" band of zone temperatures centered around the zone set point temperature. The command signal is highly responsive to sensed zone temperature changes beyond the no load band so that the zone temperature tends to be maintained in the no load band.

An alternative system is disclosed in which no load bands occur at two distinct command signal values and operation of damper units is effected when the command signal value shifts between the no load band values.

3 Claims, 6 Drawing Figures

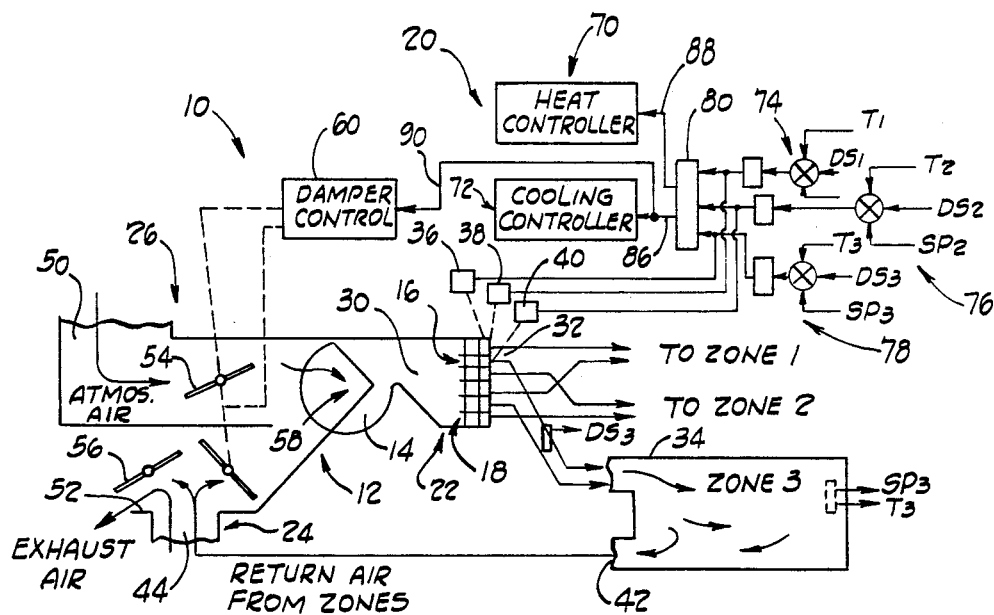
Fig. 1
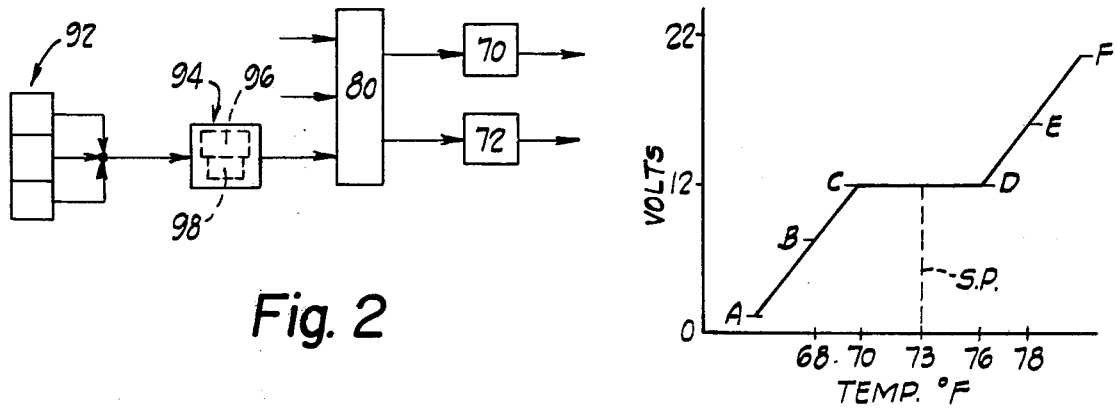
Fig. 2
Fig. 3

METHOD AND APPARATUS FOR CONTROLLING AIR-CONDITIONING SYSTEMS

CROSS-REFERENCED PATENTS

U.S. Pat. No. 3,745,778 issued July 1973 to Attridge;
U.S. Pat. No. 3,788,386 issued Jan. 1974 to Demaray;
U.S. Pat. No. 3,915,376 issued Oct. 1975 to Attridge, et al.

BACKGROUND OF THE INVENTION

The present invention relates to air conditioning systems and more particularly relates to the control of air conditioning systems which both heat and cool an air conditioned zone.

THE PRIOR ART

Air conditioning systems which both heat and cool air conditioned zones are commonly used and these systems have sometimes employed controls which automatically operate the heating or cooling equipment depending on sensed load conditions in the zones. Prior art control systems operated the heating and cooling equipment at relatively narrow temperature differentials so that zones being controlled were held closely to preselected, or "set point" temperatures.

In multiple zone air conditioned buildings, the control systems frequently operated the heating and cooling equipment simultaneously so that while one zone was being cooled, another might be heated, and other zones at intermediate temperatures might be simultaneously supplied with heated and cooled air. All zones could, in this fashion, be maintained quite close to the zone set point temperatures. Examples of prior art control systems which function in the manner referred to are disclosed by the above-referenced U.S. patents.

Control systems of the general type referred to were extremely successful in maintaining closely controlled zone temperatures in both single and multiple zone buildings. The zone temperatures were closely controlled because the control systems were highly sensitive to zone temperature changes and reacted promptly to maintain the temperatures at set point levels. This high degree of responsiveness made systems employing the controls somewhat expensive to operate. The heating and cooling equipment sometimes tended to be cycled frequently and/or operated simultaneously. Proposals have been made to reduce the cost of operation of the systems by increasing the use of atmospheric air for cooling and providing heating from sources of waste heat (see U.S. Pat. Nos. 3,788,386 and 3,915,376.

As a result of power and fuel scarcity, guidelines concerning thermostat settings have been adopted which recommended that during the heating season, equipment should not be operated until zone temperatures fall below 68° F, while cooling equipment should not be operated until the zone temperatures exceed 78° F. These guidelines have been impossible to follow in many air conditioned buildings of the character referred to because zone heating and cooling loads vary widely and control system differentials between heating and cooling have been inherently small. In such structures, particularly multiple zone buildings employing the prior art control systems, the upward or downward adjustment of the zone set point temperatures levels is frequently immaterial so far as operation of the heating and cooling equipment is concerned because, in some zones, the heating and cooling equipment may be operating together to maintain the set point temperature level regardless of where it is set. Consequently, lowering or raising the thermostat settings will not necessarily permit energy savings.

Guideline-type operation might be approximated by providing control systems which are significantly less sensitive and responsive to zone temperature variations from a set point level but the lack of sensitivity could permit zone temperatures to fluctuate too widely for occupants of the buildings to remain comfortable.

SUMMARY OF THE INVENTION

The present invention provides a new and improved method and system for controlling heating and cooling equipment in an air conditioning system wherein the heating and cooling equipment is automatically operated in accordance with sensed zone temperature conditions, neither the heating equipment nor the cooling equipment is rendered effective through a substantial range, or "no load" band, of sensed zone temperature conditions around the set point temperature and yet the system is highly sensitive and responsive to zone temperatures outside the no load band.

According to preferred embodiments of the invention, an air conditioning system having zone heating and cooling equipment is provided with a zone sensor arrangement for producing sensed zone temperature condition signals and a command function generator for effecting operation of either the heating or the cooling equipment. The command function generator comprises a command signal generator and a command signal modifier which coact to produce a command signal having first and second value ranges within which the respective heating and cooling equipment operates and an intervening no load band region within which the heating and cooling equipment does not operate even though the zone temperature may vary through a substantial range.

The no load band is so called because even though zone temperatures change within the band these changes are ineffective to signal a change in load on the zone and since the heating and cooling equipment does not operate when the temperature is in the band.

The command signal values vary substantially within the first and second value ranges as a function of sensed zone temperature conditions in these ranges. This significant variation in command signal level versus sensed zone temperature change assures a high degree of control system sensitivity and responsiveness to zone temperature levels. The command signal modifier affects the command signal generator operation so that command signal values in an intervening no load band region vary relatively little in response to sensed zone temperature condition changes.

The new control system thus insures that the heating and cooling equipment are maintained inactive so long as sensed zone temperature conditions are within a predetermined range of the set point temperature (i.e., in the no load band), yet provides for prompt and effective operation of zone heating or cooling equipment whenever the sensed zone temperature conditions are outside of the range. Zone temperatures thus can vary within a relatively wide no load band without requiring operation of any air conditioning equipment and operating costs are reduced.

Another important feature of the invention resides in the maintenance of zone temperatures within a wide no load band by anticipating the direction of temperature change in the zone during the no load band and conditioning the air conditioning system to oppose such changes without operating the heating and cooling equipment. An illustrated forced air, air conditioning system utilizes air damper units which are operated so that the system opposes anticipated zone temperature changes out of the no load band.

In one preferred air conditioning system employing the invention, a forced flow of air is circulated in the system, heated and/or cooled by the equipment and flowed through multiple, controlled zones. The proportions of heated and/or cooled air flowing to any given zone are determined by a zone damper unit which is operated according to the command signal produced from the sensed zone temperature conditions. In addition, an atmospheric air damper unit is provided for controlling the quantity of atmospheric air entering the system. The atmospheric air is used for ventilating the zones and for cooling the zones to the extent possible. The atmospheric air damper unit is controlled by the command signal from a controlling zone.

The zone damper units are operated through a third command signal value range at least part of which is between the first and second command signal value ranges. The command signal is configured so that the zone damper units of a zone or zones which are neither the hottest nor the coolest are operated to anticipate changing zone load conditions reflected by the command signal from such zones. By anticipating the changing conditions in these zones, they tend not to load air condition equipment being operated by another controlling zone.

In particular, a control system constructed according to one preferred form of the invention is conditioned so that when the zone command signal values shift from one of the first or second value ranges toward the other value range the damper units controlled by the command signal are operated to anticipate command signals in the other value range while the zone temperature is in the no load band. The anticipatory damper unit operation thus tends to maintain the zone temperature in the no load band without loading the equipment.

In one preferred form of the invention, the command signal configuration includes a "no load" band region occurring at two different command signal values. The dual no load band command signal regions are both between the command signal value ranges where the heating and cooling equipment operate. The third command signal value range within which the damper units are operable is disposed at least partly between the dual level no load band regions of the command signal. The command signal value at which the no load band region occurs is at a first level when the zone temperature is rising from the signal value range where the heating equipment operates and at a second level when the zone temperature is dropping from the signal value range where the cooling equipment operates.

In order to produce the dual level no load band command signal a command function generator is provided with a level shifting arrangement which alters the operation of the command signal modifier in response to detected command signal values.

Other features and advantages of the invention will become apparent from the following description of a preferred embodiment made in reference to the accompanying drawings.

BRIEF DESCRIPTION OF THE DRAWINGS

FIG. 1 is a schematic diagram of an air conditioning system constructed according to the invention;

FIG. 2 is a schematic diagram of part of an air conditioning control system embodying the invention;

FIG. 3 is a graphic representation of a configuration of a command signal voltage versus sensed zone temperature produced in a system embodying the invention;

DESCRIPTION OF A PREFERRED EMBODIMENT

Figure 4:
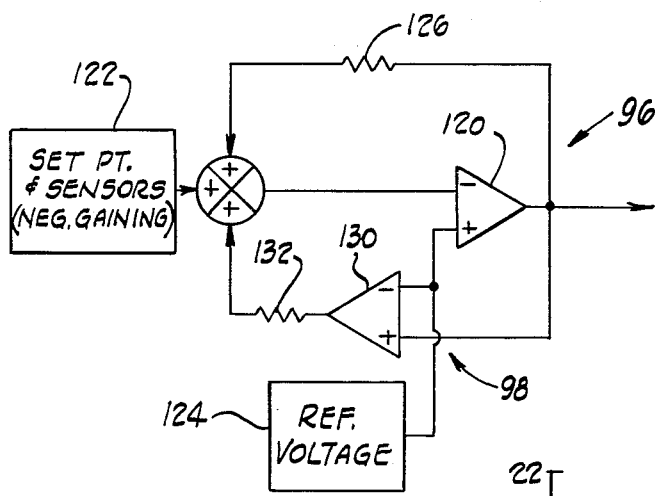
FIG. 4 schematically illustrates a command function generator constructed according to the invention for producing the command signal of FIG. 3.

An air conditioning system 10 constructed according to a preferred embodiment of the invention is schematically illustrated in FIG. 1. The system 10 provides conditioned air to three separate zones of a multiple zone building, which itself is not illustrated. The zones are referred to as zone 1, zone 2, and zone 3, and only zone 3 is illustrated schematically. The system 10 includes an air circulating duct network 12, a blower 14 for providing a forced flow of air through the duct network, air heating equipment indicated by the reference character 16 and air cooling equipment 18, both of which have portions disposed within the duct network for heating or cooling air flowing through the network, and a control system generally indicated by the reference character 20 which governs operation of the system 10.

The system 10 is, for the most part, schematically illustrated and is described only briefly. Many components of the system 10 are shown and described in greater detail in the above-referenced U.S. patents to which reference should be made for additional details. Departures in the system disclosed here from those of the referenced patents will be apparent from the following description.

The heating equipment can be of any suitable or conventional construction but for the purpose of this description is considered to be constructed from a plurality of electrical resistance heaters which are operated in stages to govern the amount of heat transferred to the air in the system.

The air in the system is preferably mechanically chilled by compressor-condensor-evaporator refrigeration equipment, not shown. The cooling equipment is operable in stages to govern the amount of heat absorbed from the air in the system. One or more evaporators of the refrigeration equipment are disposed in the duct for cooling the system air.

The air duct network 12 comprises an air delivery duct system 22 for directing air from the blower 14 to the respective zones through the heating and cooling units 16, 18, respectively, a return air duct system 24, only partly shown, for receiving air exhausted from the zones, and a ventilation system 26 by which atmospheric air is admitted to the system 10 while a corresponding amount of air from the return air duct system 24 is exhausted from the system. The system 10 is of a type known as a constant volume system in that a constant flow rate of air continuously circulates in the system and each zone is continuously provided with an unvarying flow rate of air.

The delivery duct system 22 comprises a blower plenum section 30 in which the heating and cooling units 16, 18, are disposed so that air moving through the plenum 30 towards the zones passes across either the heating unit or the cooling unit, a zone damper section 32 at the discharge side of the heating and cooling units, and three discharge ducts 34 (only one of which is partially shown) for directing air from the damper section 32 to each associated respective zone.

The damper section 32 includes three actuable damper pairs (not shown), one pair for each zone. The damper pairs are actuated by respective zone damper control units 36, 38, 40 in accordance with temperature requirements of associated zones. The damper pairs for each zone enable complementary dampering of air flowing to that zone from the heating unit 16 and the cooling unit 18. The damper pair for each zone has one limit position in which all of the air flowing to the zone passes across the heating unit, a second limit position in which all of the air flowing to the zone passes across the cooling unit, and intermediate positions in which the flow of air to the zone consists of a mixture of air which has passed across the heating unit and the cooling unit, with the proportions of the mixture being determined by the position of the damper pair.

The return duct system 24 comprises zone exhaust branches 42 (only one of which illustrated in connection with zone 3) communicating each zone to a main return duct 44 which directs the combined zone exhaust air flows to the ventilating system 26.

The ventilating system 26 comprises an atmospheric air intake duct 50 through which atmospheric air is introduced into the system 10, an exhaust duct 52 through which air from the return duct 44 is exhausted to atmosphere from the system, and a dampering arrangement for controlling the flow of air through the intake and exhaust ducts 50, 52.

The control system 20 governs operation of the heating and cooling units 16, 18, the zone damper control units 36, 38 and 40, and the damper control unit 60 in response to sensed conditions of air circulating in the system 10 as well as sensed atmospheric air conditions. The control system is preferably an electrical system and includes an air heating controller 70 for governing the heat transfer to system air from the heating equipment 16, an air cooling controller 72 for governing heat transfer from the system air to the cooling equipment 18, individual zone load transmitter systems 74, 76, 78 for sensing the respective zone loads and producing temperature related command signals for governing operation of the controllers 70, 72, and a logic unit 80 interposed between the load transmitter systems and the controllers.

In the preferred and illustrated embodiment, the command signals are low amperage DC analog signals, and the heating and cooling controllers are constructed to operate dthe heating and cooling equipment in stages in response to appropriate changes in command signal values transmitted to them. The load transmitter systems are such that as the zone air temperature rises, the magnitude of the command signal value tends to increase positively with respect to a reference value. As the zone temperature is reduced, the command signal value likewise tends to be reduced.

The logic unit 80 enables the control system 20 to satisfy the heating requirements of the coolest zone and the cooling requirements of the warmest zone while the heating or cooling requirements of the remaining intermediate zone is satisfied by operation of its associated zone damper control unit alone. The command signal from the warmest zone has the most positive voltage level, the command signal from the coolest zone has the least positive voltage level, and the command signal from the zone of intermediate temperature has an intermediate voltage level. The logic unit 80 is connected to the outputs of each zone load transmitter and functions to transmit the command signal from the warmest zone to the cooling controller 72 via an output conductor 86 and to transmit the command signal from the coolest zone to the heating controller 70 via a conductor 88. The command signal from the remaining intermediate zone (or zones, if more than three zones are present in the building) is blocked by the logic unit, but remains effective to govern the positioning of the zone damper unit for that zone.

Atmospheric air is introduced in quantity to the system to effect "free" cooling of the zones by the outside air. The introduction of atmospheric air to the air conditioning system is variably controllable by the command signal from the warmest zone. For this purpose a conductor 90 interconnects the ventilating damper control unit 60 to the logic unit output conductor 86.

The load transmitter systems 74, 76, 78 are all identical and therefor only the system 78 associated with zone 3 is described. Referring to FIG. 2, the load transmitter system 78 is illustrated as including a zone temperature condition sensor 92, and a command function generator 94 which coact to produce a command signal configuration as illustrated by FIG. 3 of the drawings.

The zone temperature condition sensor 92 produces a signal which is the algebraic summation of a zone air temperature signal T, a discharge duct air temperature signal DS, and a zone 3 set point temperature signal (SP). The zone air temperature signal T is preferably provided by a sensing circuit including a thermistor, or equivalent element, which is disposed in the zone. The discharge duct air temperature signal is preferably provided by a circuit including a thermistor or other equivalent sensing element situated in the discharge duct 34 adjacent the zone damper section 32. The zone set point temperature signal is preferably provided by a circuit including a manually adjustable potentiometer which is controlled, within limits by an occupant of the zone. The zone and duct sensing circuits are schematically illustrated in FIGS. 1 and 2 and may be of any suitable or conventional construction.

The command function generator 94 includes a command signal generator 96 which responds to the input zone condition signals and a command signal modifier 98 which substantially varies the command signal under certain zone temperature conditions. A typical command signal produced by the command function generator 94 is illustrated by FIG. 3. The command signal of FIG. 3 is illustrated in terms of voltage and sensed zone temperature and, in the illustrated embodiment, varies between limits of 2 and 22 volts DC.

The operation of the heating and cooling equipment and damper units as controlled by zone 3 is graphically demonstrable from FIG. 3 of the drawings. The heating and cooling equipment operate, respectively, in first and second command signal voltage value ranges approximately indicated by the line segments A-B (heating) and E-F (cooling) The damper units operate in a third voltage value range approximately indicated between the line segment ends B-E. A no load band region of the command signal is approximately indicated by the line segment C-D.

Assuming zone 3 is at a lower sensed temperature than either of the other zones, the zone 3 command signal value varies between, say, 2 and 10 volts; the heating equipment is modulated or operated in stages by the heating controller to respond to the zone 3 command signal in the first value range.

When the zone 3 sensed temperature conditions rise sufficiently (e.g., to a level between 68° F and 70° F,) the heating equipment is no longer operated and the zone damper units are operated to progressively reduce the proportion of the air entering zone 3 which has passed across air heaters. When the command signal reaches the location indicated at C (12volts) the zone damper unit is conditioned to introduce equal proportions of air which has passed the air heaters and air coolers.

At this juncture the zone temperature is about 70° F and the command signal enters the no load band region (line segment C-D) during which the sensed zone temperature may vary widely without materially changing the command signal value. This region extends equally from each side of the zone set point temperature (73° F in the illustration) and enables the zone temperature to float through a six degree range without any heating or cooling equipment being operated.

Further sensed zone temperature increases result in the command signal increasing along the line segment D-E during which the zone damper unit is operated to progressively increase the proportion of zone air which has passed the air cooling equipment. At the same time, assuming that zone 3 is the warmest zone, the atmospheric air damper unit begins to be progressively opened toward its maximum open position. This permits zone 3 to be cooled by atmospheric air.

If the atmospheric air temperature increases to a predetermined level the atmospheric air damper unit is abruptly operated to its minimum open position.

The cooling equipment is operated in the command signal value range indicated by the line segment E-F. Preferably multiple air coolers are operated in stages and/or modulated to maintain the zone temperature within limits.

A command function generator circuit capable of producing the command signal of FIG. 3 is illustrated by FIG. 4. The command signal generator includes a pair of signal amplifiers 100, 102 having their inverting inputs connected to respective reference voltage sources 104, 106, their noninverting inputs connected to the zone sensor 92 and their outputs connected to a high input impedance buffer amplifier 108 via the command signal modifier 98. The command signal generator 96 is formed by an amplifier 120, a zone temperature condition signal source 122 connected to the inverting input of the amplifier 120 and a reference source 124 connected to the noninverting amplifier input. A negative feedback resistor 126 is connected between the amplifier output and inverting input to stabilize the amplifier operation.

The zone signal source 122 produces negativegoing signals in response to sensed positive-going zone temperatures so that the command signal level output by the amplifier 120 varies directly with sensed zone temperature changes.

The command signal modifier 98 is formed by an amplifier 130 which is rendered effective to suppress operation of the amplifier 120 under certain conditions. The amplifier 130 has its noninverting input connected to the output of the amplifier 120, its inverting input connected to the reference source 124 and its output connected to the inverting input of the amplifier 120 via a bandwidth controlling resistor 132.

When the zone temperature is low, but rising, the amplifier 120 produces a rising low level command signal in the heating equipment operating value range (line segment A-B of FIG. 3) and part of the damper unit operating value range (line segment B-C). The suppressor amplifier 130 is inactive whenever the command signal output from the amplifier 120 is along the line segment A-C.

When the output of the amplifier 120 reaches the no load band region level the suppressor amplifier 130 becomes active, in that the command signal value supplied to its noninverting input is sufficient to cause the suppressor amplifier to produce an output. The suppressor amplifier output is transmitted to the inverting input of the amplifier 120 and effectively opposes the zone temperature signals provided by the signal source 122. As the zone temperatures increase through the no load band (e.g., from 70° F. to 76° F.) the command signal output level from the amplifier 120 increases such a small amount that, for practical purposes, the command signal level is constant. Any tendency toward an infinitesimal rise in the command signal level results in an offsetting output from the suppressor amplifier 130.

When the zone temperatures increase beyond the no load band (i.e., above 76° F.) the suppressor amplifier 130 becomes saturated and further increases in command signal level at its noninverting input do not create any further increases in its output level. Accordingly, operation of the amplifier 120 is not suppressed and the command signal can rise unrestrictedly along the line segments D-E and E-F in response to further zone temperature increases.

When sensed zone temperatures are reduced again, the command signal level is reduced to the no load band region level at which time the suppressor amplifier becomes active again to suppress further command signal level changes until the zone temperature is reduced below the no load band.

The load transmitter illustrated by FIG. 4 is described in reference to a multiple zone air conditioning control system and can be used in such systems as well as in single zone systems where the air heating equipment and air cooling equipment is not simultaneously operated.

Figure 5:
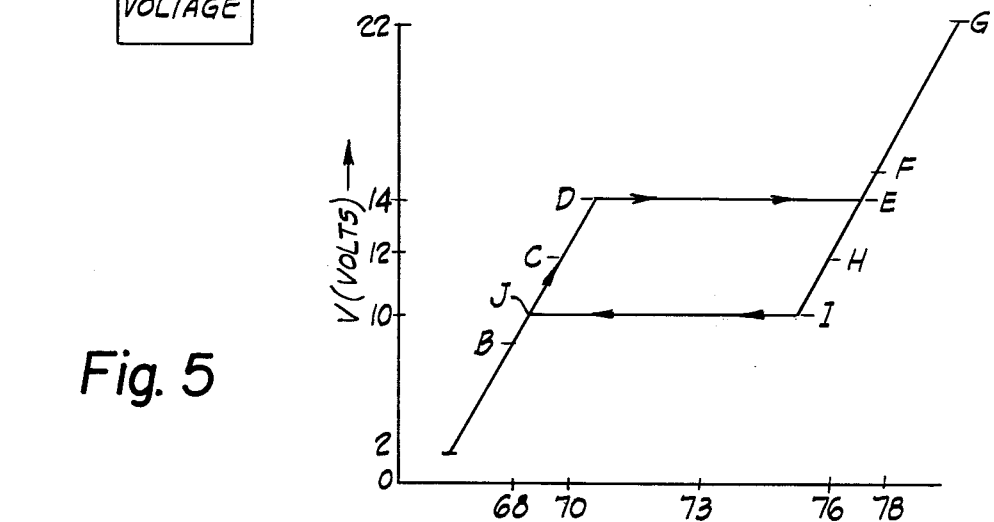
FIG. 5 is a graphic representation of another command signal configuration.

FIG. 5 illustrated the operation of another control system according to the principles of the present invention wherein the no load temperature band region occurs at two command signal levels. Appropriate damper unit operation is accomplished when the command signal level is altered between the dual no load band region levels. The command signal configuration illustrated by FIG. 5 is representative of the command signal produced by one load transmitter of a multiple zone system such as that illustrated by FIG. 1 of the drawings. The command signal configuration illustrated by FIG. 5 is particularly well adapted for use in multiple zone systems because operation of the damper units is effected in anticipation of changing zone load conditions and thus the zone being controlled tends to remain in the no load temperature band over longer periods of time.

Operation of a dual no load band zone according to the invention is best described in reference to FIG. 5. As before, the heating and cooling equipment operate, respectively, in first and second command voltage value ranges (A-B and F-G). The damper units within a third command signal voltage value range between the first and second value ranges (i.e., between B and R in FIG. 5). The dual no load band regions are defined by the line segments D-E and I-J.

When the sensed zone temperature is relatively low compared to set point temperature and rising, the command signal level ranges upwardly from its minimum of 2 volts through a heating equipment operating value range indicated the line segment A-B of FIG. 5. While the command signal level is varying on the line segment A-B, the heating equipment is cycled on and off, staged or modulated (depending on the air conditioning system).

When the zone temperature level increases above 68° F., the command signal value increases into the third value range where the damper units are operable. Initially the signal level is in the region indicated by the line segment B-C of FIG. 5. In the illustrated embodiment the line segment B-C terminates at the midrange of the command signal, i.e., 12 volts. As the command signal increases from B to C, the zone damper unit 36 is repositioned from a condition in which all of the air flowing to the zone passes across the air heating equipment to a condition where the zone damper unit is conditioned so that half of the air flowing to the zone passes the heating equipment and half of the air flowing to the zone passes the cooling equipment (command signal voltage at 12 volts). In other words, at the command signal midrange the zone damper unit is conditioned more or less neutrally so that the zone does not tend to be heated or cooled as a result of the zone damper positioning.

As the sensed zone temperature continues to increase the command signal increases through the value region indicated by the line segment C-D and the zone damper unit is progressively conditioned to proportion more and more of the air entering the zone across the air cooling equipment. When the command signal reaches the level indicated at D none of the air flowing to the zone has passed across the air heating equipment and, accordingly, if any heating equipment is being operated in response to command signals from other zones, the zone whose command signal is illustrated by FIG. 5 does not receive any heated air and does not therefore contribute to the system heating load.

The damper units are conditioned for maximum cooling effect in the zone (as described) in anticipation of the zone temperature increasing. When the sensed zone temperature does increase, the command signal moves through the no load band region indicated by the line segment D-E. In the illustrated embodiments of the invention the no load band region preferably has a voltage level at around 13½ volts (i.e., 1.5 volts higher than the midrange level of the command signal) and the no load band voltage is virtually constant. When the command signal is at the level indicated by the line segment D-E in FIG. 5, no operation of the damper units or the heating or cooling equipment occurs as a result of that command signal. Zone 3 is accordingly free to "float" in the no load band, which is approximately 6° F. wide, with the damper units already conditioned so that increases in zone temperature are opposed.

Further increases of the zone temperature increase the command signal level into the operating value range indicated by the line segment F-G. If the atmospheric air temperature is below a predetermined temperature, the atmospheric air damper unit can be modulated toward its fully opened position by the command signal. In addition, the cooling equipment is operated by the command signal values in the F-G value range. One or more stages of air cooling equipment are operated (depending on command signal values) to direct mechanically chilled air to the zone in question. When atmospheric air temperature increases above the predetermined temperature, the atmospheric air damper unit is operated to its minimum open position.

As zone temperature is again reduced the command signal level is reduced into the zone damper unit operating voltage range (line segment F-E-H-I) before the second no load band region level is encountered. In this range of command signals air cooling equipment operation is discontinued. The atmospheric air damper unit, assuming the atmospheric air temperature is sufficiently low, is operated to its minimum open position by the command signal. The zone damper unit is progressively actuated so that at the command signal midrange the zone damper unit is again in its "neutral" condition. Further reduction in sensed zone temperature causes the command signal to be reduced to the level indicated at I during which the zone damper unit is progressively conditioned so that more and more of the air flowing to the zone passes the heating equipment and less and less zone air passes the cooling equipment.

The command signal next moves across the second no load band region indicated by the line segment I-J which, as noted, is below the midpoint of the command signal range and preferably around 10.0 to 10.5 volts. The second no load region is offset slightly from the first region but the zone temperature no load band is still about 6° F. wide. Since the zone damper units are conditioned for heating the zone before the second no load band is encountered, reduced zone temperature is anticipated by the system thus tending to maintain the zone in the no load band. Moreover, the zone whose command signal is in this no load band region does not participate in the system cooling load.

Figure 6:
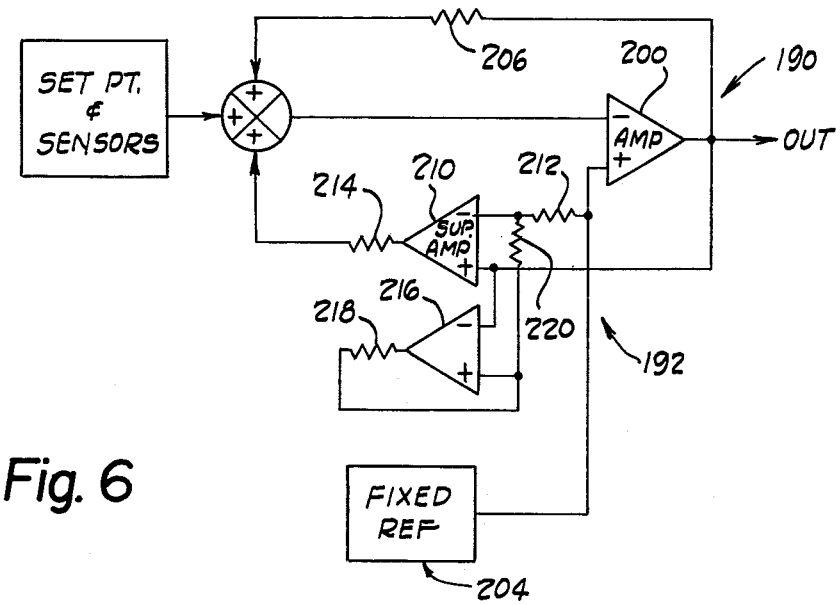
FIG. 6 is a schematic representation of a command function generator for producing the command signal configuration of FIG. 5.

The configuration of the command signal illustrated by FIG. 6 resembles a hysteresis loop. Controlling operation of the system in accordance with a command signal configuration of the character illustrated by FIG. 6 is particularly advantageous because the sense direction of change of the command signal into either no load region of the command signal configuration causes the damper units to be operated to anticipate the load being applied to the zone (heating or cooling). The zone dampers are thus operated to minimize the zone load to the extent possible during each no load band region.

A control function generator for producing a command signal of the character illustrated by FIG. 5 is schematically illustrated by FIG. 6. The control function generator includes a command signal generator generally indicated at 190 and a command signal modifier generally indicated at 192.

The command signal generator includes an amplifier 200 having its inverting input terminal connected to a suitable zone temperature sensor, like the sensor 122, referred to above, and its noninverting inputs connected to a fixed reference voltage source schematically indicated at 204. A negative feedback, stabilizing resistor 206 is connected between the amplifier output and its inverting input.

The command signal modifier 192 includes command signal suppressor circuitry which coacts with the amplifier 200 to provide the no load band region of the command signal configuration and a no load band region level shifter circuit which coacts with the suppressor circuitry to control the command signal value at which the no load band region occurs. The command signal circuitry comprises a suppressor amplifier like the suppressor amplifier described in reference FIG. 4 in that when the command signal output from the amplifier 200 is sufficient to cause controlled operation of the suppressor amplifier, further changes in the command signal level are suppressed throughout the no load band of the zone. The suppressor amplifier 210 having its noninverting input terminal connected to the output of the amplifier 200 and its output terminal connected to the inverting input of the amplifier 200 via a resistor 214. The inverting input terminal of the amplifier 210 is connected to the reference source 204 via a resistor 212.

When the command signal output from the amplifier 200 is in the heating equipment operating range, its value is low enough with respect to the voltage at the suppressor amplifier inverting input that the suppressor amplifier is inactive and thereafter has no effect on the amplifier 200.

When the output from the amplifier 200 increases sufficiently with respect to the voltage level at the suppressor amplifier inverting input, the suppressor amplifier is rendered conductive and effective to suppress the output from the amplifier 200. The suppressor amplifier output is connected to the input of the amplifier 200 so that any tendency of the amplifer 200 output to increase is suppressed from the output of the amplifier 210.

The suppressor amplifier remains effective until it saturates, i.e. when increases in its input signal value do not cause corresponding increases in its output values. When the suppressor amplifier 210 saturates, the command signal output from the amplifier 200 can again increase as sensed zone temperatures increase.

The no load band region level shifter circuit is effective to alter the command signal voltage level at which the suppressor amplifier 210 is rendered effective. The level shifter includes a switching amplifier 216 operable between a high output state in which the no load band region is at a relatively high command voltage level, and a low output state wherein the no load band region occurs at a lower command signal value. The switching amplifier has its inverting input connected to the command signal output from the amplifier 200 and its noninverting input connected to the fixed voltage reference 204 via resistors 220 and 212. The switching amplifier output is connected to the inverting input of the suppressor amplifier 210 through resistors 218, 220. Positive feedback is provided for the amplifier 216 from its output through the resistor 218 to its noninverting input.

When the command signal values are low, i.e. in the heating equipment operating value range, the switching amplifier output is at its high state or level. The reference voltage level at the noninverting input of the switching amplifier is sufficiently great relative to the low level command signal value that the amplifier produces a high level output signal. The output from the switching amplifier 216 is maximized because of positive feedback provided through the resistor 218. The high output state of the switching amplifier 216 raises the voltage level at the inverting input of the suppressor amplifier 210, thus raising the command signal voltage level required for the suppressor amplifier 210 to be rendered effective. In the illustrated embodiment the output from the amplifier 216 in its high state is such that the suppressor amplifier 210 is maintained inactive until the command signal voltage is around 13.5 or 14 volts.

When the command signal voltage level is high, i.e., in the cooling equipment operating value range, the switching amplifier output is in its low state, or level. The high command signal inverting input of the switching amplifier 216 is sufficiently great relative to the voltage at the noninverting input that the output from the switching amplifier is reduced to a low level. This has the effect of reducing the magnitude of the voltage level at the suppressor amplifier inverting input thus enabling the suppressor amplifier 210 to be rendered effective at a command signal voltage level which is comparatively low. In the illustrated embodiment of the invention when the switching amplifier 216 is operated to its low output state the command signal voltage level required to operate the suppressor amplifier is reduced to about 10 to 10.6 volts.

The amplifiers referred to in connection with FIGS. 4 and 6 are all conventional operational amplifiers and therefore have not been illustrated in detail. The amplifiers preferably form parts of a semiconductor device providing four such amplifiers and known as a quad op amp. These are commercially available from Motorola (M.C. 3403) and National Semiconductor (LM324: LM 2902).

While different embodiments of the present invention have been illustrated and described in considerable detail, the invention is not to be considered limited to the precise constructions shown. For example, if desired, the control system could be modified so that the damper unit operation occurs within the no load zone temperature band. This can be accomplished by providing a command signal configuration having a dual level no load band region formed by a relatively low command signal value section contiguous with the heating equipment operating value range, a high command signal value section contiguous with the cooling equipment operating value range and an intermediate ramp-like section in the vicinity of the zone set point temperature along which the damper units are modulated. Various adaptations, modifications and uses of the invention may occur to those skilled in the art to which the invention relates and the intention is to cover all such adaptations, modifications and uses which fall within the scope or spirit of the appended claims.

What is claimed:

1. In an air conditioning system having zone heating equipment, zone cooling equipment and a control system for governing operation of the heating and cooling equipment in response to electric analog zone temperature condition responsive signals from a zone sensor, the improvement comprising:
 a signal amplifier having one input connected to the zone sensor and its output connected for controlling the heating and cooling equipment, said signal amplifier producing a command signal whose values vary in accordance with changes in sensed zone temperature conditions above and below a no load band of zone temperatures;
 a command signal modifier means comprising a suppressor amplifier having one input connected to the signal amplifier output and its output connected to said one signal amplifier input; and a reference voltage source connected to the other inputs of said signal amplifier and said suppressor amplifier;

said suppressor amplifier rendered effective by a predetermined command signal value indicative of a sensed zone temperature in said no load band, said suppressor amplifier output, when effective, substantially preventing the signal amplifier output from varying from said predetermined command signal value in response to variations in sensed zone temperature within said no load band;

said suppressor amplifier output ineffective to prevent command signal variations in response to variations in sensed zone temperatures outside of said no load band.

2. A system as claimed in claim 1 wherein said command signal modifier further includes bistable switching amplifier means having its output connected to said other suppressor amplifier input, said switching amplifier operable between first and second output states to shift the command signal values required to render said suppressor amplifier effective between first and second predetermined respective command signal levels.

3. A system as claimed in claim 2 wherein said switching amplifier means has an input connected to said signal amplifier output and is operated to one of its output states in response to command signals indicative of zone temperatures a predetermined level above said no load band, said switching amplifier means operated to its other output state in response to command signals indicative of zone temperatures a predetermind level below said no load band.

* * * * *